Patented July 21, 1925.

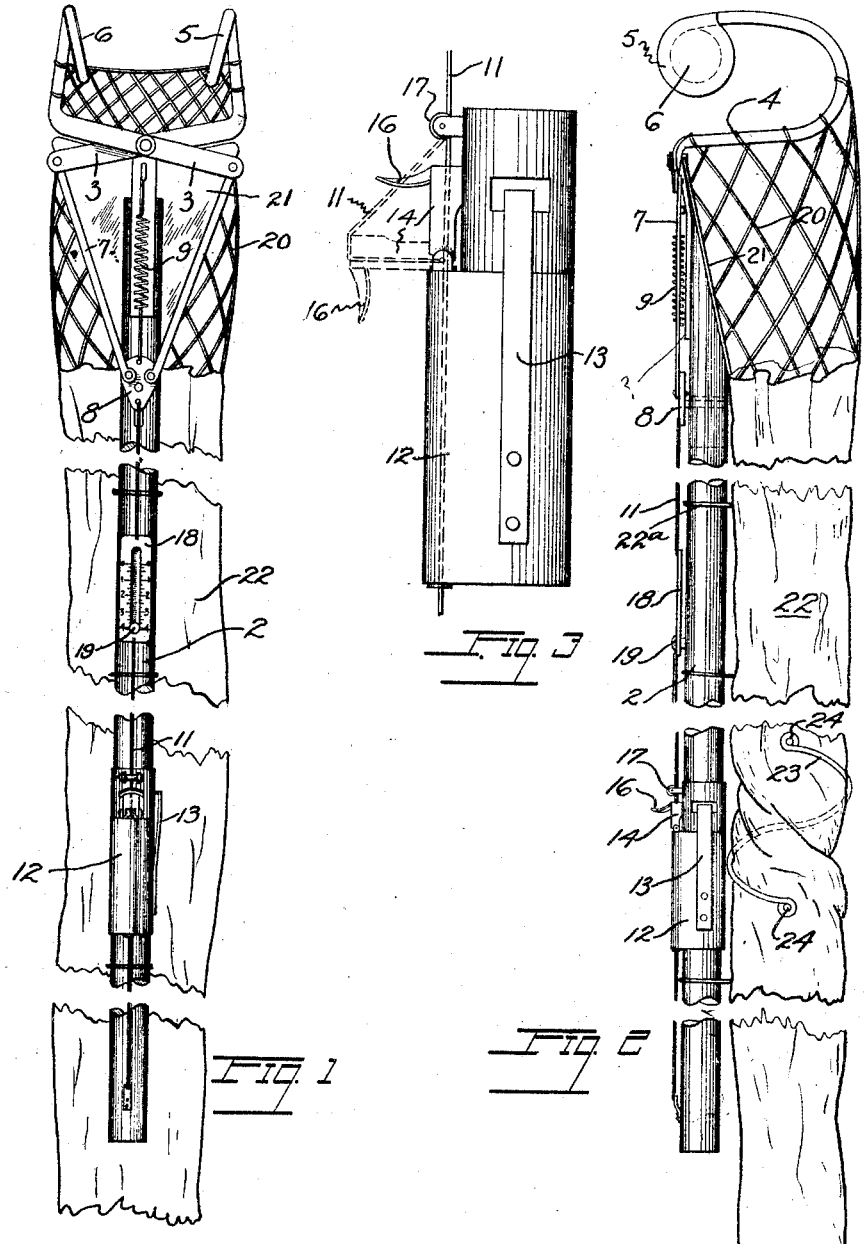

1,546,530

UNITED STATES PATENT OFFICE.

RUITARO AKAHOSHI, OF WALNUT GROVE, CALIFORNIA.

FRUIT PICKER.

Application filed September 13, 1921. Serial No. 500,434.

*To all whom it may concern:*

Be it known that I, RUITARO AKAHOSHI, a citizen of Japan, and a resident of Walnut Grove, county of Sacramento, and State of California, have invented a new and useful Fruit Picker, of which the following is a specification.

My invention relates to devices for picking fruit. One of the objects of the invention is the provision of a fruit picking device, operable by a man on the ground, with which the size of the fruit may be gauged before it is separated to determine whether or not it is of the required size.

Another object of the invention is the provision of a fruit picking device embodying superior means for preventing the bruising of the fruit as it passes from the tree to the bag of the operator. Another object of the device is the provision of a fruit picking apparatus having improved jaw operating means.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Referring to the drawings, Fig. 1 is an elevation of the fruit picker. Fig. 2 is an elevation taken in a plane at right angles to that of Fig. 1. Fig. 3 is an elevation of a portion of the device drawn on a larger scale.

In general terms the device of my invention comprises a pole upon which jaws for seizing the fruit are mounted at one end. The jaws are controlled by a line extending down the pole and secured thereto at the lower end. A grip is slidably arranged on the pole and provided with means for fixing it in position on the pole when grasped by the hand of the operator. Means are provided on the grip for operating the line to close the jaws upon the fruit. Means are interposed in the line for evaluating the spread of the jaws so that the size of the fruit may be determined before it is detached. This is of importance since commercial canning companies specify for some fruits, such as pears, definite sizes, and the fruit is picked only when within the limits of the stated sizes. Arranged below the jaws to receive the severed fruit is a conduit formed of fabric and means are provided for retaining a certain portion of the conduit in a permanent twist to retard passage of the fruit so that bruising is avoided.

More particularly my device comprises a pole 2 of suitable length on one end of which are pivotally mounted the cross levers 3, bent as shown in the drawings to provide arms 4, which are provided at the ends with eyes 5. The eyes are for seizing the fruit and to prevent injury of the fruit are covered with a rubber casing 6 which provides a yielding pad between which the fruit is securely held when the jaws are closed.

The ends of the levers are connected by links 7 with a plate 8 slidably mounted on the pole, and a spring 9 interposed between the plate 8 and the pole tends to draw the plate upwardly and retain the jaws in the open position. The spring returns the jaws to the open position after they have been closed. A line 11 is connected to the plate 8 at one end and at the other end to the lower end of the pole, passing thru the grip 12 which is slidably arranged on the pole. On the side of the grip is a spring 13, its free end provided with a point which locks in the pole when the spring is depressed by grasping the grip in the hand. Pivoted on the grip is a lever 14, provided with a thumb piece 16 with which the lever may be thrown outwardly into the position indicated by the dotted lines in Fig. 3. The lever is hollow and when the parts are assembled the line 11 is passed thru the lever and under the idler pulley 17 also fixed on the grip. When the lever is thrown outwardly by pressure of the thumb, the grip being held stationary on the pole by engagement of the spring latch 13, the line is of course pulled down, as indicated in Fig. 3, and thru its mediate connections with the jaws the latter are closed upon the fruit. Upon release of the thumb piece 16 the spring 9 effects a recovery movement of the line and opens the jaws to release the fruit.

Means are provided for evaluating the spread of the jaws. In accordance with the present practice the fruit picker is provided with a ring to gauge the size of the fruit before detaching it. In my invention I provide means with which the size of the fruit may be accurately determined when the jaws have closed upon the fruit. Interposed in the line 11 is a graduated plate 18 divided to indicate quarters of inches up to four inches. The plate is slotted in the center to slide on a stud 19 which is provided with pointers.

With the parts at rest as shown in Fig. 1 the pointers are opposite the graduation 4 indicating that the spread of the jaws is four inches. As the line is drawn down to close the jaws their spread at any point may be read directly on the graduated plate, so that if the fruit is less than the required size after being grasped by the jaws, it may be released without picking it from the tree.

Means are provided for conducting the fruit after separation from the tree down the length of the pole to a bag usually carried by the operator. Attached to the jaw arms 4 is a net 20 also secured at one side to the plate 21 on the upper end of the pole and connected into the fabric conduit 22 extending down the pole and fastened at intervals thereto by means of loops 22ª. In order to retard the movement of the fruit falling thru the conduit, the conduit is twisted near the bottom of the pole so that fruit striking the twisted portion is gradually retarded without bruising. In order to permanently maintain the twisted portion a helically formed wire 23 is secured about the twisted section and secured to the conduit by means of the eyelets 24. The lower end of the conduit is conveniently tucked into a bag worn by the operator. The fruit passing the twisted portion comes to rest in a loop of the conduit between the twisted portion and the bag and from time to time the operator lifts this loop to permit the fruit to fall into the bag.

*Operation.*—With one hand of the operator on the pole and the other on the grip 12 the grip is moved to any convenient location as the jaws are placed adjacent the fruit to be picked. Tightening the grasp on the grip sets the latch 13 in the pole and fixes the grip stationary. Movement of the thumb then moves the lever 14 outwardly and draws down the line to actuate the jaws. As the jaws seat about the fruit the size is noted on the graduated plate 18 and, if within the limits desired, a twisting or pulling movement of the device as a whole breaks the stem of the fruit which is then permitted to fall from the jaws to the conduit when the thumb piece 16 is released.

Because the operator is stationed on the ground and can move freely about the trees a very large saving of time is effected. Not estimating the greater safety of being on the ground instead of on a ladder, I find that I can pick more than twice as much fruit with my device as I could under the old methods of hand picking.

I claim:

1. A fruit picking device comprising a pair of jaws, means for closing the jaws upon the fruit, a fabric conduit for conducting the fruit from the jaws, and means for maintaining a twisted portion of said conduit to retard passage of said fruit.

2. A fruit picking device comprising a pole, jaws arranged on the pole for seizing the fruit, means for operating the jaws, and means operated by said jaw operating means for evaluating the spread of the jaws.

3. A fruit picking device comprising a pole, jaws for seizing the fruit arranged on the pole, a line for operating the jaws, a grip normally slidable on said pole, means on the grip operated by the grasp of the operator for holding the grip stationary on the pole, and means on said grip for operating said line.

4. A fruit picking device comprising a pole, jaws arranged on the pole for seizing the fruit, a line for operating the jaws, a grip slidably arranged on said pole, means on said grip for operating said line, and graduated means interposed in said line for evaluating the spread of the jaws.

In testimony whereof, I have hereunto set my hand.

RUITARO AKAHOSHI.